(12) United States Patent
Coulombe et al.

(10) Patent No.: US 7,079,666 B2
(45) Date of Patent: Jul. 18, 2006

(54) SYSTEM FOR SIMULTANEOUS PROJECTIONS OF MULTIPLE PHASE-SHIFTED PATTERNS FOR THE THREE-DIMENSIONAL INSPECTION OF AN OBJECT

(75) Inventors: Alain Coulombe, Brossard (CA); Michel Cantin, Montreal (CA); Alexandre Nikitine, Montreal (CA)

(73) Assignee: Solvision Inc., Brossard (CA)

( * ) Notice: Subject to any disclaimer, the term of this patent is extended or adjusted under 35 U.S.C. 154(b) by 772 days.

(21) Appl. No.: 09/814,618

(22) Filed: Mar. 22, 2001

(65) Prior Publication Data
US 2002/0018118 A1     Feb. 14, 2002

(30) Foreign Application Priority Data
Mar. 24, 2000   (CA) .................................. 2301822

(51) Int. Cl.
*G06K 9/00*    (2006.01)
(52) U.S. Cl. .................. 382/1.54; 382/141; 348/136
(58) Field of Classification Search ................ 382/141, 382/154, 286, 151, 152, 291, 312, 100; 356/608; 348/135, 136, 139, 86, 94, 95, 42, 47, 48
See application file for complete search history.

(56) References Cited

U.S. PATENT DOCUMENTS

| | | | |
|---|---|---|---|
| 3,943,278 A | 3/1976 | Ramsey, Jr. | |
| 4,051,483 A | 9/1977 | Suzuki | |
| 4,525,858 A | 6/1985 | Cline et al. | |
| 4,656,508 A | 4/1987 | Yokota | |
| 4,736,108 A | 4/1988 | Comstock et al. | |
| 4,742,237 A | 5/1988 | Ozawa | |
| 4,796,997 A * | 1/1989 | Svetkoff et al. | 356/608 |
| 4,939,380 A | 7/1990 | Berger et al. | |
| 4,959,898 A | 10/1990 | Landman et al. | |
| 5,102,224 A | 4/1992 | Uesugi et al. | |
| 5,175,601 A | 12/1992 | Fitts | |
| 5,307,151 A | 4/1994 | Hof et al. | |
| 5,319,445 A | 6/1994 | Fitts | |
| 5,465,152 A | 11/1995 | Bilodeau et al. | |
| 5,608,529 A | 3/1997 | Hori | |
| 5,668,631 A | 9/1997 | Norita et al. | 356/376 |
| 5,909,270 A * | 6/1999 | Moser et al. | 351/212 |

FOREIGN PATENT DOCUMENTS

| | | |
|---|---|---|
| CN | 1228526 A | 9/1999 |
| EP | 0 076 866 | 4/1983 |
| EP | 0 182 469 | 5/1986 |
| EP | 0 884 558 | 12/1998 |
| GB | 2 204 397 A | 11/1988 |

(Continued)

*Primary Examiner*—Yon J. Couso
(74) *Attorney, Agent, or Firm*—Merchant & Gould P.C.

(57) ABSTRACT

A three-dimensional image grabber allowing for the simultaneous projection of multiple phase-shifted patterns onto an object, and the simultaneous acquisition of multiple images of these phase-shifted patterns is described herein. The grabber comprises a pattern projecting assembly and an image acquisition assembly. The pattern projecting assembly includes, for example, a spectral splitter or a plurality of light sources, grids and projectors for simultaneous projection of a plurality of patterns under different monochromatic lights. The image acquisition assembly includes, for example, a CCD camera sensitive to the different monochromatic lights, or a plurality of CCD cameras with filters to gather lights incoming for the object simultaneously illuminated by the plurality of phase-shifted patterns. A method and a system for measuring the relief of an object, using the above-mentioned process, is also disclosed.

21 Claims, 5 Drawing Sheets

FOREIGN PATENT DOCUMENTS

| | | |
|---|---|---|
| WO | 88/02847 | 4/1988 |
| WO | 98/02756 | 1/1998 |
| WO | 98/55826 | 12/1998 |
| WO | WO 99/24786 | 5/1999 |
| WO | 01/06210 | 1/2001 |

* cited by examiner

SYSTEM FOR SIMULTANEOUS PROJECTIONS OF MULTIPLE PHASE-SHIFTED PATTERNS FOR THE THREE-DIMENSIONAL INSPECTION OF AN OBJECT

FIELD OF THE INVENTION

The present invention relates to methods for three-dimensional inspection objects. More specifically, the present invention is concerned with a system for simultaneous projections of multiple phase-shifted patterns onto objects for their three-dimensional inspection.

BACKGROUND OF THE INVENTION

The use of interferometric methods for three-dimensional inspection of an object or to measure the variations of height (relief) of an object is well known. Generally stated, these methods consist in generating an interferometric pattern on the surface of the object and then analyzing the resulting interferometric image (or interferogram) to obtain the relief of the object. The interferometric image generally includes a series of black and white fringes.

Interferometric methods that require the use of a laser to generate the interferometric pattern are usually called "classic interferometric methods". In such classic methods, the wavelength of the laser and the configuration of the measuring assembly generally determine the period of the resulting interferogram. Classic interferometry methods are generally used in the visible spectrum to measure height variations in the order of micron.

However, there has been difficulty in using such a method to measure height variations on a surface showing variations in the order of 0.5–1 mm when they are implemented in the visible spectrum. Indeed, the density of the black and white fringes of the resulting interferogram increases, causing the analyzis to be tedious.

Another drawback of classic interferometric methods is that they require measuring assemblies that are particularly sensitive to noise and vibrations.

Three-dimensional inspection methods based on Moiré interferometry allow for a more accurate measurement of the object in the visible spectrum as compared to the accuracy of classic interferometric methods. These methods are based on the analyzis of the frequency beats obtained between 1) a grid positioned over the object to be measured and its shadow on the object ("Shadow Moiré Techniques") or 2) the projection of a grid on the object, with another grid positioned between the object, and the camera that is used to photograph the resulting interferogram ("Projected Moiré Techniques"). In both cases, the frequency beats between the two grids produce the fringes of the resulting interferogram.

More specifically, the Shadow Moire technique includes the steps of positioning a grid near the object to be measured, providing illumination from a first angle from the plane of the object (for example 45 degrees) and using a camera, positioned at a second angle (for example 90 degrees from the plane of the object), to photograph the interferogram.

Since the distance between the grid and the object varies, this variation of height produces a variation in the pattern of the interferogram. This variation in the pattern can then be analyzed to obtain the relief of the object.

A drawback to the use of a Shadow Moire technique for measuring the relief of an object is that the grid must be very closely positioned to the object in order to yield accurate results, causing restrictions in the set-up of the measuring assembly.

The Projected Moiré technique is similar to the Shadow Moiré technique since the grid, positioned between the camera and the object, has a function similar to the shadow of the grid in the Shadow Moiré technique. However, a further drawback of the Projected Moiré technique is that it involves many adjustments, and therefore generally produces inaccurate results since it requires the positioning and tracking of two grids. Furthermore, the second grid tends to obscure the camera, preventing it from being used simultaneously to take other measurements.

The use of methods based on "phase-shifting" interferometry allows measurement of the relief of an object by analyzing the phase variations of a plurality of images of the object after projections of a pattern thereto. Each image corresponds to a variation of the position of the grid, or of any other means producing the pattern, relative to the object.

Indeed, the intensity I(x,y) for every pixel (x,y) on an interferometric image may be described by the following equation:

$$I(x,y)=A(x,y)+B(x,y) \cdot \cos(\Delta\Phi(x,y)) \quad (1)$$

where $\Delta\Phi$ is the phase variation (or phase modulation), and A and B are a coefficient that can be computed for every pixel.

In the PCT application No. WO 01/06210, entitled "Method And System For Measuring The Relief Of An Object", Coulombe et al. describe a method and a system for measuring the height of an object using at least three interferometric images. Indeed, since Equation 1 comprises three unknowns, that is A, B and $\Delta\Phi$, three intensity values $I_1$, $I_2$ and $I_3$ for each pixel, therefore three images are required to compute the phase variation $\Delta\Phi$.

Figure 1:
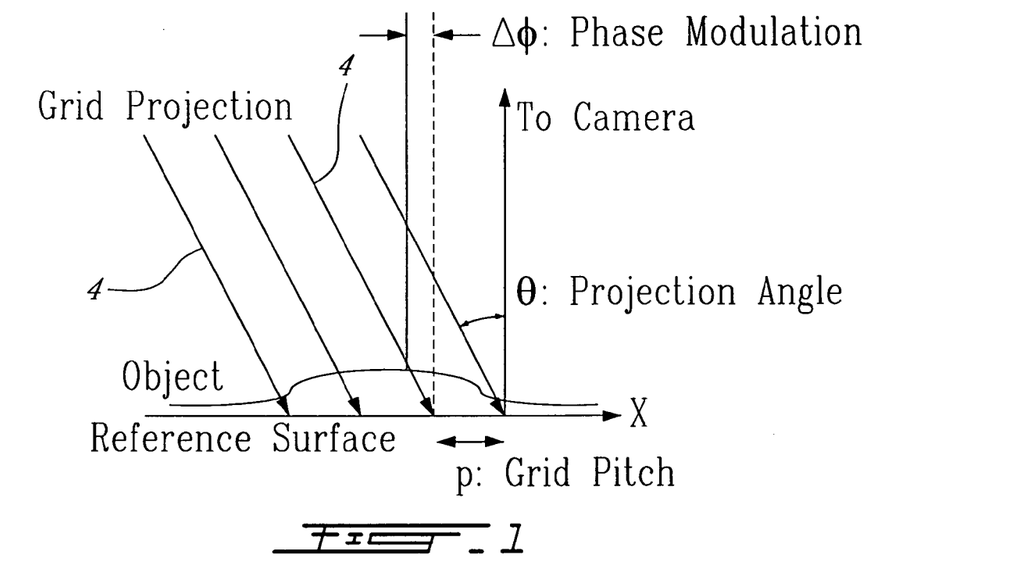
FIG. 1 is a schematic view illustrating the projection of a grid on an object.

Knowing the phase variation $\Delta\Phi$, the object height distribution (the relief at every point h(x)y) relative to a reference surface can be computed using the following equation (see FIG. 1):

$$h(x, y) = \frac{\Delta\Phi(x, y) \cdot p}{2\pi \cdot \tan(\theta)} \quad (2)$$

where p is the grid pitch and $\theta$ is the projection angle, as described hereinabove.

The three images used by Coulombe et al. correspond to small translation of a grid relative to the surface of the object. The displacements of the grid are so chosen as to yield phase variations in the images. Coulombe et al. suggest obtention of the images by using a system that allows moving the grid relative to the object to be measured. A minor drawback of such a system is that it requires moving the grid between each take of images, increasing the image acquisition time. This can be particularly detrimental, for example, when such a system is used to inspect moving objects on a production line. More generally, any moving parts in such systems increase the possibility of imprecision and also of breakage.

A method and a system for three-dimensional inspection of an object free of the above-mentioned drawbacks of the prior-art is thus desirable.

SUMMARY OF THE INVENTION

More specifically, in accordance with the present invention, there is provided a three-dimensional image grabber comprising:

a pattern projecting assembly for simultaneously projecting at least two phase-shifted patterns onto an object; each of the projected patterns being characterized by a predetermined bandwidth; and an image acquisition apparatus sensitive to the predetermined bandwidths for simultaneously taking an image of each of the projected patterns on the object.

According to another aspect of the present invention, there is provided a system for measuring the relief of an object, the system comprising:

a pattern projecting assembly for simultaneously projecting at least three phase-shifted patterns onto the object; each of the projected patterns being characterized by a predetermined bandwidth;

an image acquisition apparatus sensitive to the predetermined bandwidths for taking an image of each of the at least three phase-shifted projected patterns on the object; each of the images including a plurality of pixels having intensity values; and a controller configured for:
a) receiving from the image acquisition apparatus the at least three images of the projected patterns onto the object;
b) computing the object phase for each pixel using the at least three object intensity values for the corresponding pixel; and
c) computing the relief of the object at each pixel position using the object phase at the corresponding pixel position.

A system according to the present invention may advantageously be used for lead-coplanarity inspection.

According to still another aspect of the present invention, there is provided a method for measuring the relief of an object comprising:

simultaneously projecting at least three phase-shifted patterns onto the object;
a) taking an image of each of the at least three phase shifted patterns on the object to gather an intensity value at pixel positions on the image;
b) computing the object phase for each of the pixel positions using the at least three object intensity values for the corresponding pixel; and
c) computing the relief of the object at each pixel position using the object phase at the corresponding pixel position.

A system and a method for measuring the relief of an object according to embodiments of the present invention are advantageous since they allows inspection of a moving object using fixed components.

Other objects, advantages and features of the present invention will become more apparent upon reading the following non-restrictive description of preferred embodiments thereof, given by way of example only with reference to the accompanying drawings.

DESCRIPTION OF THE PREFERRED EMBODIMENT

Figure 2:
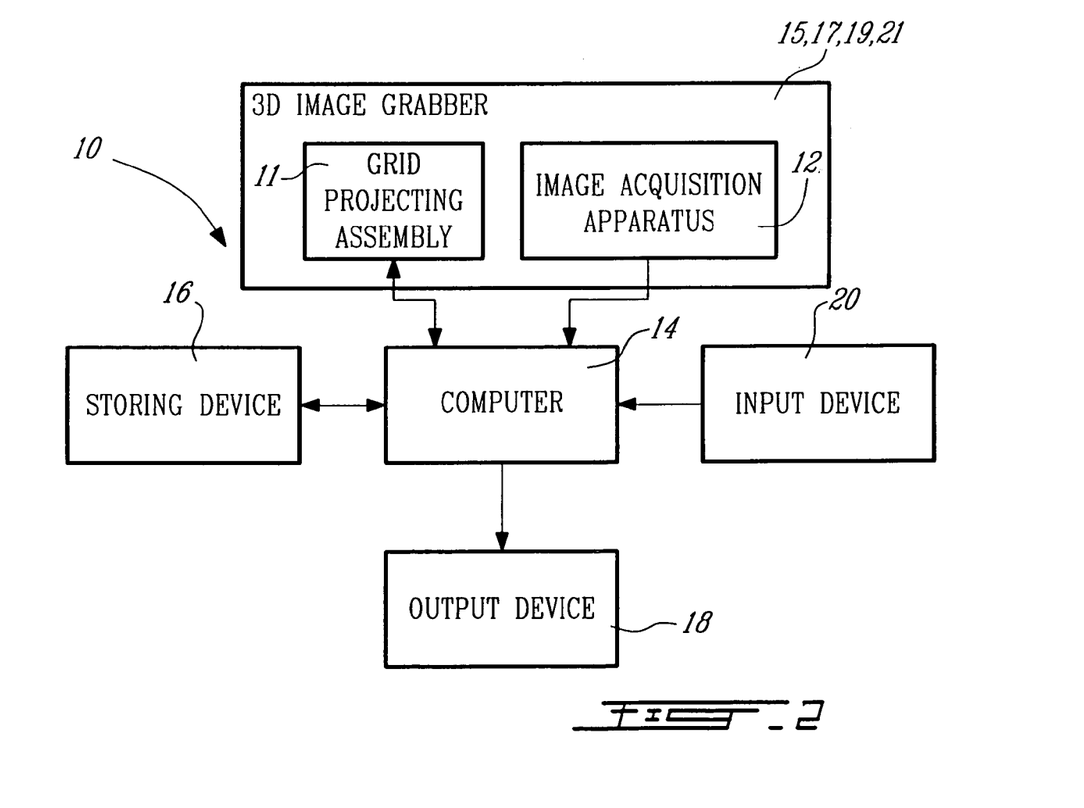
FIG. 2 is a schematic view of a system for measuring the relief of an object according to an embodiment of the present invention.
Figure 3:
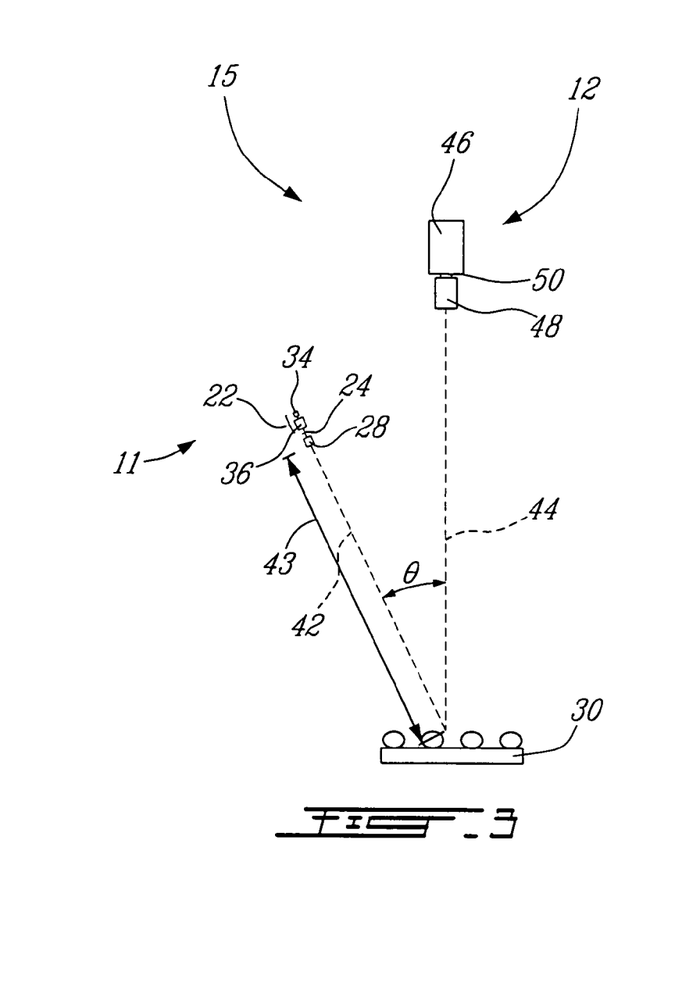
FIG. 3 is a schematic view of the three-dimensional image grabber of FIG. 2 according to a first embodiment of the present invention.

Turning now to FIGS. 2 and 3 of the appended drawings, a system 10 for measuring the relief of an object, according to an embodiment of the present invention, will be described.

The system for measuring the relief of an object 10 comprises a grid projecting assembly 11, an image acquisition apparatus 12, and a controller in the form of computer 14 advantageously provided with a storing device 16, an output device 18 and an input device 20. Together, the grid projecting assembly 11 and the image acquisition apparatus 12 form a three-dimensional image grabber (hereinafter referred to as a "3D grabber") 15 and will be described hereinbelow in more detail.

The computer 14 is advantageously configured to process the images obtained by the system 15 and to analyze these images to measure the relief of an object 30 (see, for example, FIG. 3).

The image processing and the measurement of the relief of the object 30 may be advantageously done using a method according to an embodiment of the present invention, as will be described further. However, other methods can also be used, without departing from the spirit and nature of the three-dimensional image grabber of the present invention.

The computer 14 is advantageously provided with memory means allowing the storage of the images when they are processed by the computer 14 to therefore increase the processing speed.

The storing device 16 can be, for example, a hard drive, a writable CD-ROM drive or other well-known data storing means. It can be directly connected to the computer 14, or remotely connected via a computer network such as the Internet. According to an embodiment of the invention, the storing device 16 is used to store both the images taken by the image acquisition apparatus 12, the relief of the object 30 and other intermediary results. Those files can be stored in many format and resolution that can be read by the computer 14.

The output device 20 allows visualization of the images and of the data produced by the computer 14, and can take many forms from a display monitor to a printing device.

The input device 18 can be a conventional mouse, a keyboard or any other well-known input device, or combination thereof, which allows inputting of data and commands into the computer 14.

The computer 14 can be a conventional personal computer or any other data processing machine that includes a processor, a memory and input/output ports (not shown). The input/output ports may include network connectivity to transfer the images to and from the storing device 16.

Of course, the computer 12 runs software that embodies a method for measuring the relief of an object, as will be described hereinbelow.

Turning now specifically to FIG. 3 of the appended drawings, a 3D grabber 15, according to a first embodiment of the present invention, will be described in more detail.

The grid projection assembly 11 includes an illuminating assembly 22, a grid 24 mounted to a support (not shown), and a projector 28.

The illuminating assembly 22 advantageously includes a source of white light 34 that is projected through the grid 24. For example, the source 34 is the end of an optical fiber (not shown) providing light from a white light source (not shown). An aspherical lens 36 or any other condenser is also advantageously used between the source 34 and the grid 24. It is believed to be within the reach of a person skilled in the art to conceive another illuminating assembly within the spirit of the present invention. Alternatively, the grid may be replaced by any pattern mounted in a frame.

Figure 4:
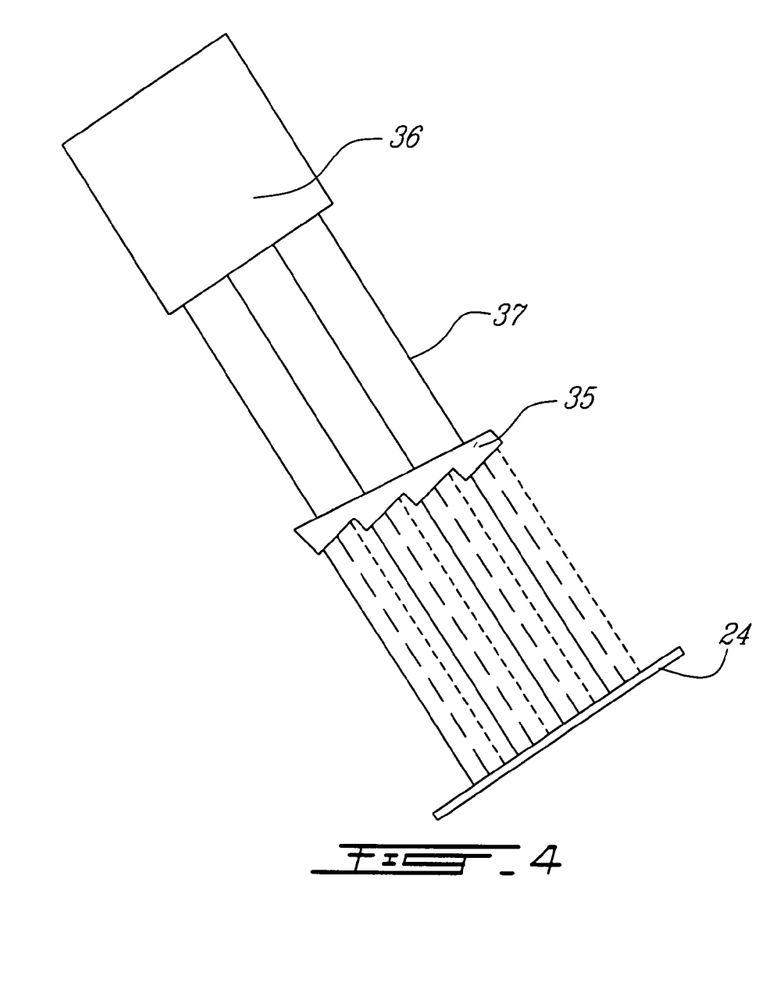
FIG. 4 is a schematic view of a spectral splitter according to an embodiment of the invention.

According to a first embodiment of the present invention, the illuminating assembly 22 also includes a spectral splitter (or "light splitter") 35 positioned between the illuminating assembly 22 and the grid 24 (see FIG. 4). The spectral splitter 35 is designed to decompose the white light 37 produced by the light source 34 into at least two different monochromatic lights (each of the three styles dashed lines in FIG. 4 represent a monochromatic light) or two non overlapping bandwidths.

Of course, if one of the 3D image grabbers 15, 17, 19 and 21 is to be used for the measure of the relief of an object using a phase-shifted method, they should be modified to simultaneously project at least three phase-shifted grids as will be explained hereinabove.

Alternatively, any means configured to decompose white light into a plurality of monochromatic lights or into two non overlapping bandwidths may also be used.

Also, a non-white source of light including a plurality of monochromatic light may alternatively replace the source of white light.

Since devices producing such results are believed to be well-known in the art, they will not be described herein in further detail.

The configuration of the grid 24 may vary depending on the resolution that is required to adequately measure the relief of the object 30. For example, it has been found that a ronchi ruling having 250 lines per inch allows measurement of the lead coplanarity of a circuit board, where a resolution of approximately 1 mm is required.

A projector 28, in the form of a 50 mm TV lens, is advantageously used to project the grid 24 onto the object 38.

The use of a white light source 34 projected through a spectral splitter 35 and then through a grid 24 advantageously allows the simultaneous projection of at least two monochromatic phase-shifted grids onto the object 30.

The spectral splitter 35 may alternatively be in the form of a prism-like device, decomposing the white light into a continuous spectrum of light. In the current example, the image acquisition apparatus 12 may be configured to be sensitive to a discrete number of wavelengths.

The angle θ between the direction of incidence of the light (dashed line 42 on FIG. 2) and the line of sight of the image acquisition apparatus 12 (dashed line 44 on FIG. 2) may vary depending on the nature of the object 30 to be measured.

It is believed to be within the reach of a person skilled in the art to position the illuminating assembly 22, the grid 24 and the grid projector 28 relative to the object 30, to yield projected grids having the desired pitch p onto the object 30.

For example, a ronchi grid, having a density of 250 lines per inch, with a distance 43 of 22 cm between the object 30 and the projector 28, and for an angle θ of 30 degrees, provides projected grids having a 0.5 mm pitch p. Such a pitch is equivalent to a variation of height of about 1 mm on the surface of the object 30.

Obviously, the pitch of the projected grids will vary with the pitch of the grid 24.

It is to be noted that the system 10 does not require a grid between the camera 46 and the object 30. This advantage will be discussed hereinbelow.

Alternatively, the grid projection assembly 11 may be configured to project any other pattern by substituting the grid 24 for a semi-transparent plate including a characterized design.

The image acquisition apparatus 12 includes a camera 46 provided with an array of pixels, which is advantageously in the form of a color CCD camera, configured to be sensitive to the wavelengths of the projected grids. Each of these cameras provide, for example, a resolution of 1300×1024 pixels.

The image acquisition apparatus 12 may include a telecentric lens 48, advantageously mounted to the camera 46 via an optional extension tube 50.

The configuration of the image acquisition apparatus 12 and the distance between the apparatus 12 and the object 30 determines the field of view of the image acquisition apparatus 12. Alternatively, a desired field of view can be achieved without the extension tube 50 by adequately distancing the camera 46 from the object 30.

An image acquisition apparatus 12 allows to simultaneously take a plurality of images of phase-shifted projected grids onto the object 30.

It is to be noted that the system 10 includes an adjustable support means (not shown) to position the image acquisition apparatus 12 and the grid projecting assembly 11 relative to each other and to the object 30. Alternatively, other registration means can be used without departing from the nature and spirit of the present invention.

Figure 5:
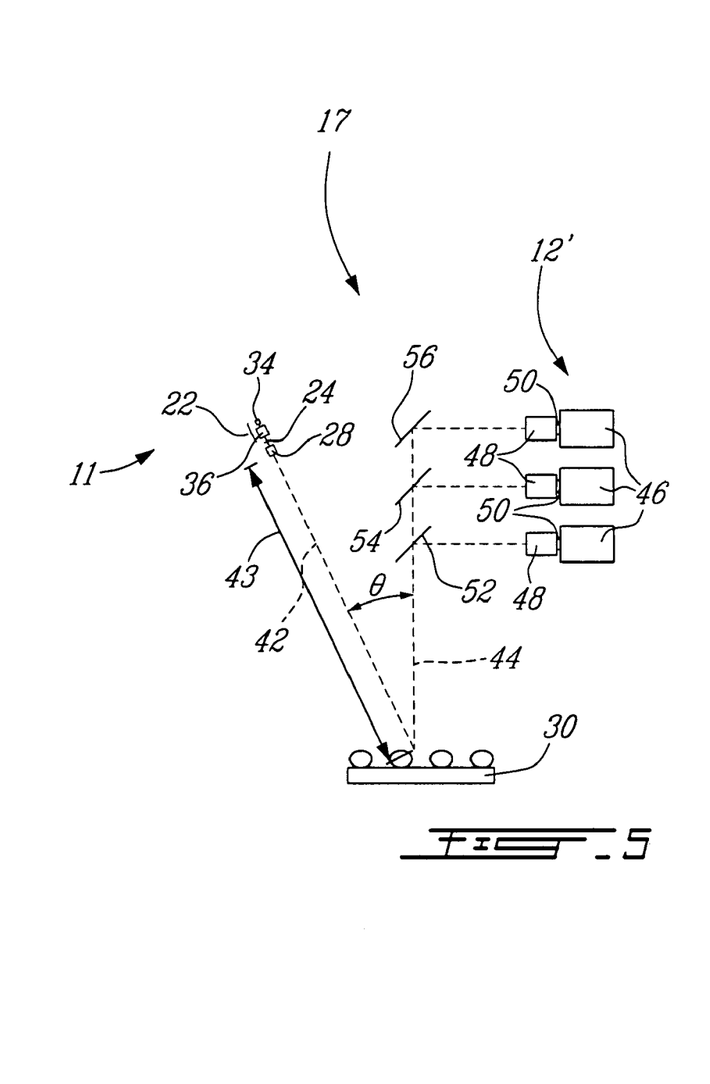
FIG. 5 is a schematic view of the three-dimensional image grabber of FIG. 2 according to a second embodiment of the present invention.

Turning now to FIG. 5, a second embodiment of 3D grabber 17 will now be described. Since the only differences between the second and first embodiments are in the image acquisition assembly, and for concision purposes, only those differences will be described herein in further detail.

The image acquisition apparatus 12' includes three cameras 46, each in the form of a CCD camera.

The use of semi-transparent mirrors and filters 52–56 allow redirection of light coming from the object 30 at an angle θ to one of the three CCD cameras 46. The filters allow discrimination of the wavelengths corresponding to the three projected grids.

More particularly, a first semi-transparent mirror 52 is configured to reflect the first wavelength intended onto a first camera 46 and to allow the remainder of the light to pass through it, including the second and third wavelengths. The second wavelength is reflected onto a second camera 46 by the second semi-transparent mirror 54 that is chosen so as to let the third wavelength through it. The third mirror 56 then reflects the light having the third wavelength onto a third camera 46.

Each of the three CCD cameras 46 advantageously includes a filter that allows obtention of the above-described result.

It is to be noted that, in both image acquisition apparatus 12 and 12', the CCD cameras can alternatively be replaced by CMOS (Complementary Metal-Oxide-Silicon) devices.

Although, the image acquisition apparatuses 12 and 12' have been described so configured as to discriminate monochromatic light, it is believed to be within the reach of a person skilled in the art to modify these apparatuses to discriminate lights having predetermined bandwidth.

Figure 6:
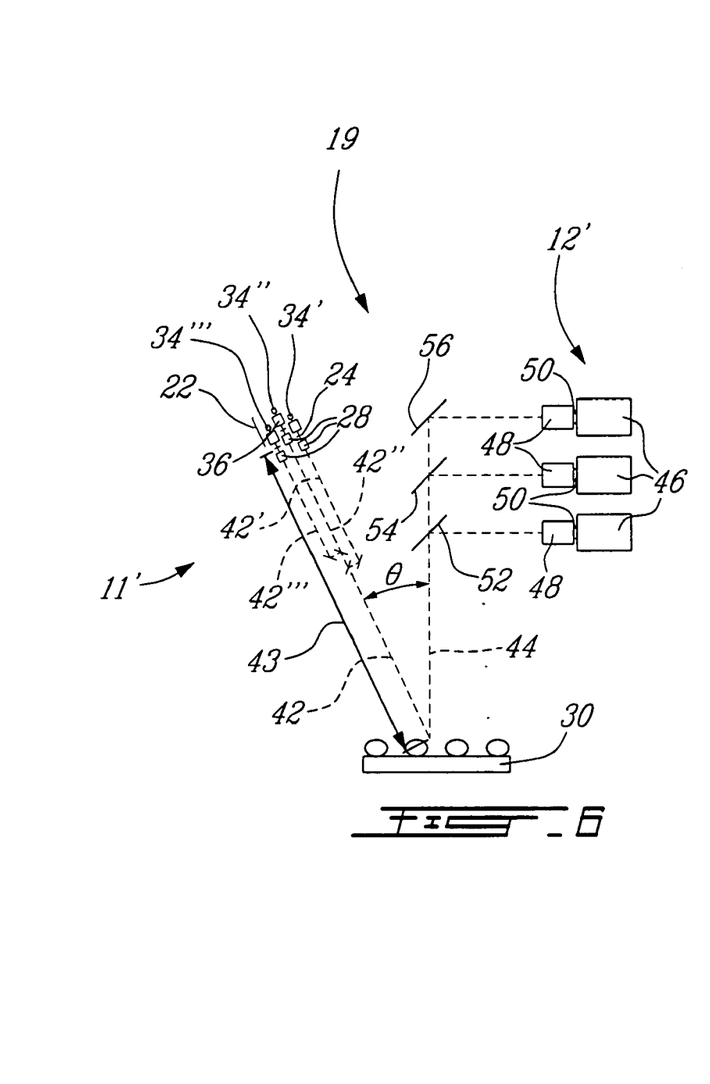
FIG. 6 is a schematic view of the three-dimensional image grabber of FIG. 2 according to a third embodiment of the present invention.

Turning now to FIG. 6, a third embodiment of a system 19 for obtaining phase-shifted images will now be described. Since the only differences between the third and second embodiments are in the projecting assembly, and for concision purposes, only those differences will be described herein in further detail.

The projecting assembly 11' includes three grid projecting apparatus, each comprising a source with a grid 24 and a projector 28 similar to the grouping of FIGS. 3 or 5, with the difference that the light source 34', 34" and 34''' are not sources of white light but emit a light beam having a predetermined wavelength different from one another.

Each of the produced beams of light are directed along a direction of incidence (dashed lines 42', 42" or 42''') and are redirected along the incidence path 42 using a reflecting arrangement that includes mirrors 58 and 62 and semi-transparent mirrors 60 and 64. Since such an arrangement of mirrors is believed to be within the reach of a person skilled in the art, it will not be described herein in further detail.

To preserve a constant pitch p for each of the projected grids, the longitudinal distance from the object of each pattern projecting apparatus may vary. Alternatively, when such constant pitch p is not preserved, the difference in path of the incidence rays must be taken into account when using the resulting images for computing the relief of an object.

Figure 7:
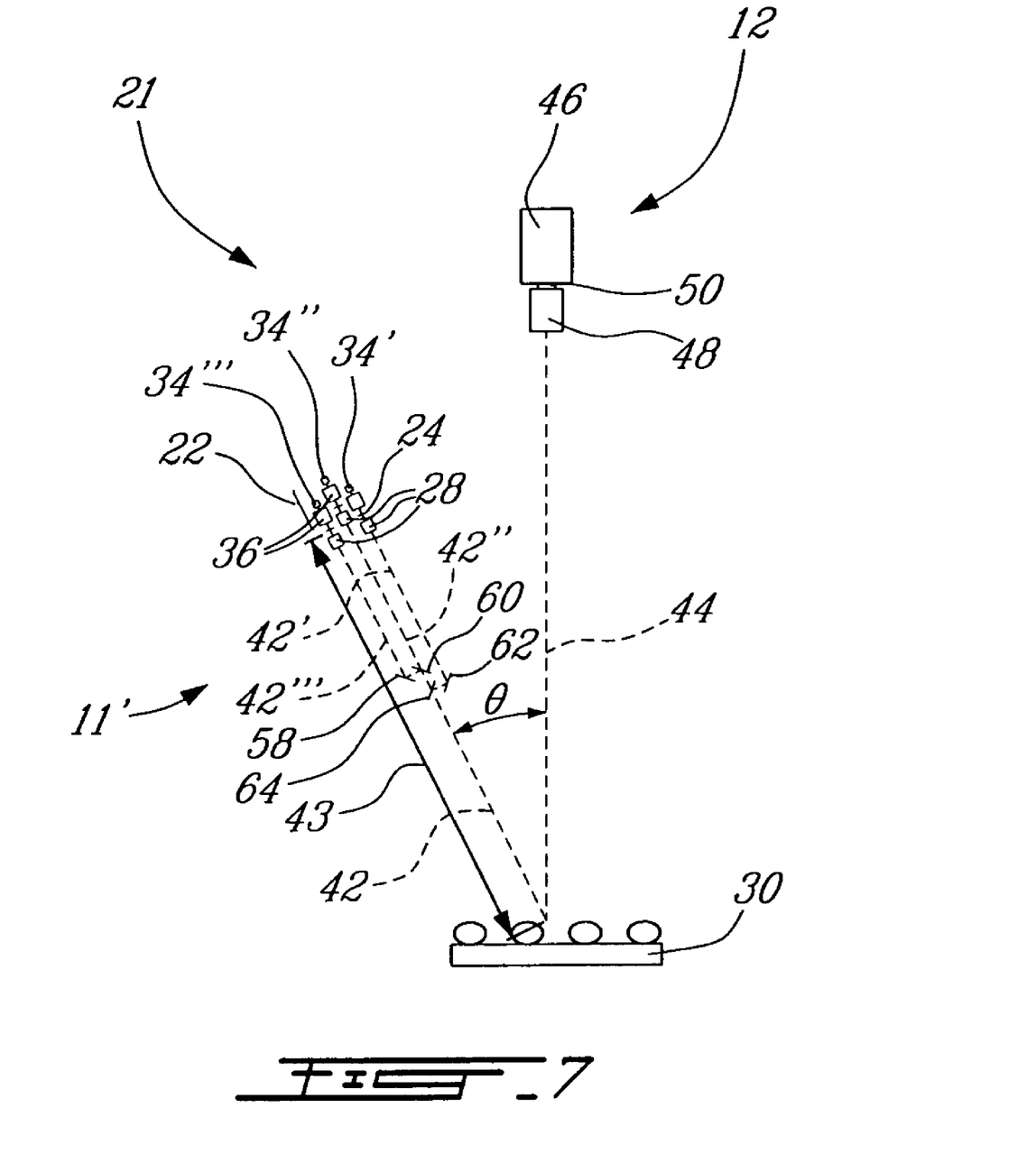
FIG. 7 is a schematic view of the three-dimensional image grabber of FIG. 2 according to a fourth embodiment of the present invention.

Obviously, the projecting assembly 11' and the image acquisition assembly 12 may be combined in a fourth embodiment of a 3D grabber 21 according to the present invention (see FIG. 7). Again, as in the case of the first three embodiments described hereinabove, the system 21 allows the simultaneous projection of three phase-shifted patterns onto an object and to then simultaneously take images of these projected patterns.

Although the systems 15, 17, 19 and 21 have been described as being configured to simultaneously project three patterns, a 3D grabber according to the present invention can be configured and used to simultaneously project any number of patterns more than two.

It is to be noted that even though three pattern projecting apparatus are illustrated in FIGS. 6 and 7, it is believed to be within the reach of a person skilled in the art to modify the 3D grabber of the present invention to allow the simultaneous projection of any number of patterns more then two.

Figure 8:
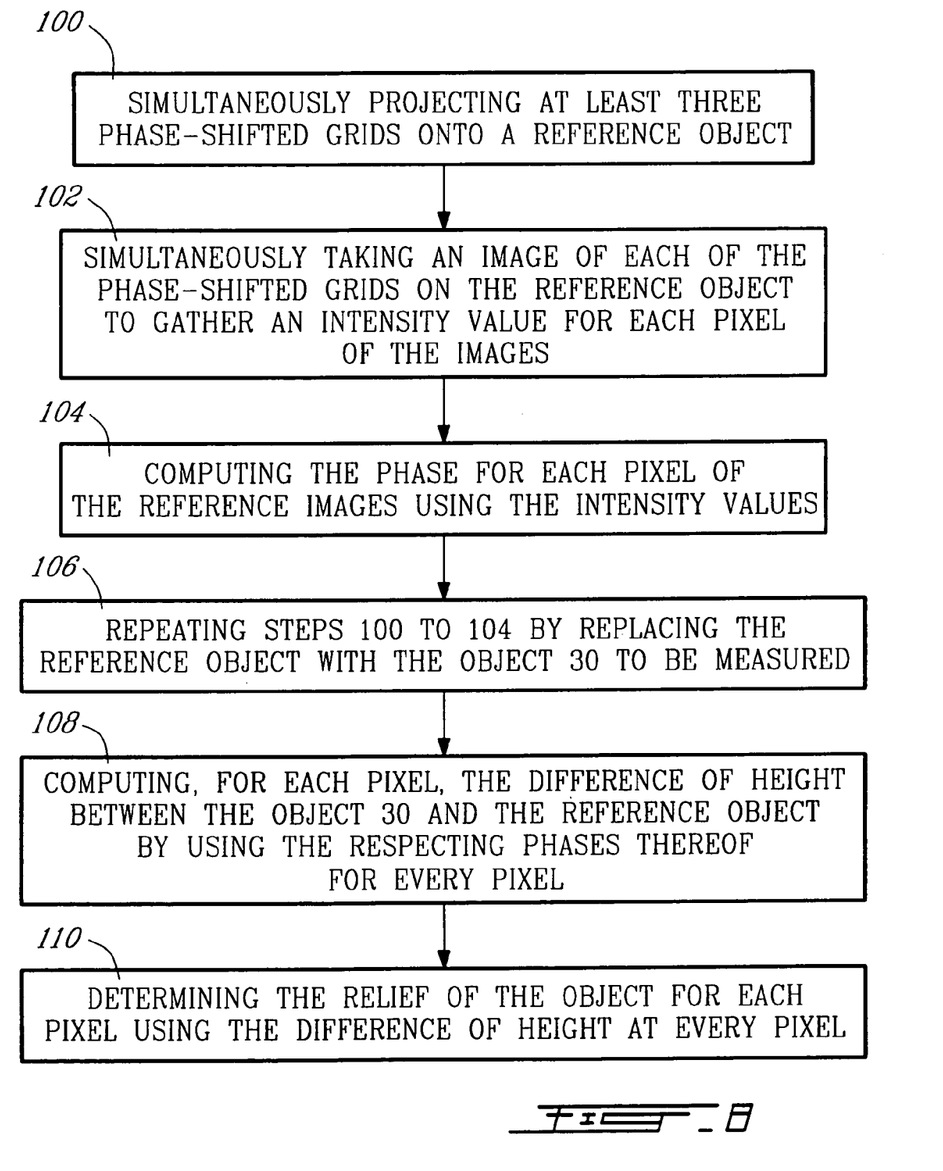
FIG. 8 is a block diagram illustrating a method for measuring the relief of an object according to an embodiment of the present invention.

Turning now to FIG. 8 of the appended drawings, a method for measuring the relief of an object, according to an embodiment of the present invention, will be described in further detail.

Generally stated, the method consists in measuring the relief of an object 30 by performing the following steps:

100—simultaneously projecting at least three phase-shifted grids onto the reference object;

102—simultaneously taking an image of each of the phase-shifted grids on the reference object to gather an intensity value for each pixel of the images;

104—computing the phase for each pixel of the reference images using the intensity values;

106—repeating steps 100 to 104 by replacing the reference object with the object 30 to be measured;

108—computing, for each pixel, the difference of height between the object 30 and the reference object by using the respecting phases thereof for every pixel; and

110—determining the relief of the object for each pixel using the difference of height at every pixel.

These general steps will now be further described with reference to a first example where the object to be measured is a lead sphere mounted to a board. However, it is to be noted that a method for measuring the relief of an object according to an embodiment of the present invention allows measurement of the relief of other three-dimensional objects.

By choosing a plain board as the reference object, the difference of height between the object and the reference object will provide the height of the sphere. The common element to the object 62 and the reference object is, in this example, the board.

In step 100, the system 10 is used to simultaneously project three phase-shifted grids onto the plain board. As it has been discussed hereinabove, the system 10 includes a means to register and fix the position of the grid(s) 24 and the camera(s) 46 relative to the reference object (and later the object).

The system 10 is also used to simultaneously take one image of the three phase-shifted grids on the reference object (step 102).

Each image includes an intensity value for each pixel of the image. The computer 14 stores these intensity values for future processing.

It is to be noted that the minimum number of phase-shifted images obtained by the system 10 is three, since Equation 1 comprises three unknowns, that is A, B and $\Delta\Phi$, and therefore three intensity values $I_1$, $I_2$ and $I_3$ for each pixel are required to compute the phase variation $\Delta\Phi$.

The system 10, and more specifically the 3D grabber 15 (or 17 or 19 or 21), allows obtention of images of a projected phase-shifted grid onto an object similar to images that could have been successively obtained by translating the grid 24 between each take.

This results in three equations similar to Equation 1 for each pixel of the pixel array of the camera 46:

$$I_n = A + B \cdot \cos(\Delta\Phi + \Delta_{100_n}) \qquad (2)$$

where n=1, 3.

By solving the system of Equation 2, one obtains the value of $\Delta\Phi$. The wavelengths of the three projected grids are chosen so as to advantageously provide different values of $\Delta\phi_1$, $\Delta\phi_2$ and $\Delta\phi_3$.

In step 104, the phase is computed using the three intensity values for each pixel by solving the Equations 2. This can be achieved by using a conventional numerical method, for example. Numerical methods for solving such system of equation are believed to be well known in the art and will not be described herein.

Since the method of FIG. 8 requires at least three images to measure the relief of an object, providing more than three images allows to select the three best values for computing the phase among the four available values for every pixels. Indeed, most methods for computing the relief of an object requires four values and do not provide the opportunity to select the best value when four images are available and one of these is saturated or noisy.

When the method of FIG. 8 is used to inspect a series of objects, steps 100 to 104 may be advantageously performed only once for the reference object before the inspection. This allows the speed of the inspection to be increased.

Images of the reference object that would have been obtained prior to any measurement of the object may also be provided.

Steps 100 to 104 are repeated by replacing the reference object with the object to be measured (step 106).

Since there is no difference in performing steps 100 to 104 with the object and with the reference object, and for concision purposes, these steps will not be described again by referring to the object.

Other methods of computing the phase of the object and/or of the reference object may alternatively be used without departing from the spirit of the present invention. These alternative methods are believed to be well-known in the art and will therefore not be described herein in further detail.

In step 108, the difference of height between the object 30 and the reference object is computed for every pixel, as obtained in step 104, by subtracting the phase of the reference object from the phase of the inspected object.

It is to be noted that the phases computed in step 104 for the object and for the reference object correspond to surface phases relative to an imaginary projection plan.

When a non-parallel projection of the grid(s) 24 is done, this imaginary projection plan becomes slightly curved. This is not detrimental to the method for measuring the relief of an object, according to the present invention, since both the images of the object and of the reference object are taken with the same system 10.

Since the phases of the object and of the reference object at each pixel correspond to the difference of height between the object (or the reference object) and the same imaginary projection plane (since the same system with the same optical set-up is used), their subtraction yields the difference of height between the object and the reference object. This allows the image acquisition of the object and of the reference object to be performed under different illumination.

In the optional step 110, the relief of the object, i.e. its height, is determined for each pixel, using the difference of height at every pixel between the object and the reference object, and knowing the dimensions of the reference object.

As will now appear obvious to a person of ordinary skills in the art, a method according to an embodiment of the present invention can be used to measure the difference of height between two objects (one being the reference). In this case, step 110 is obviously not performed.

In some applications, it may be advantageous to use a plane surface on which the object to measure will be laid on during measurement as the reference object.

In some applications, it may be advantageous to provide the system 10 with a registration system to help position the object and the reference object to a known position relative to the camera(s). Indeed, since a comparison between the object and the reference object is performed for each pixel, a registration system may ensure that corresponding points are compared.

Such registration system may take many forms including indicia on plane surface, a stand or a software program implemented in the computer.

It is to be noted that the images may be acquired first and may be processed at a future date without departing from the spirit of the present invention.

As will be apparent on reading the present description, a method, according to an embodiment of the present invention, allows measurement of the relief of an object using white light.

Although the present invention has been described in an example in which spherical objects are measured, it allows for the inspection and measurement of objects having other configurations.

The same object may also act as the reference object when the system 10 is used to study the variation in time of an object's relief.

Alternatively, the reference object may be replaced by a computer model of the object, generated, for example, by a Computer Assisted Design (CAD) that would have been virtually positioned according to the set-up of the system 10.

Although the present invention has been described hereinabove by way of preferred embodiments thereof, it can be modified without departing from the spirit and nature of the subject invention, as defined in the appended claims.

What is claimed is:

1. A three-dimensional image grabber, comprising:
   a pattern projecting assembly for simultaneously projecting at least two phase-shifted patterns onto an object; each of said projected patterns being produced by decomposition of one of:
   a white light, and
   a non-white light including a plurality of monochromatic lights, into one of:
   a plurality of monochromatic lights, and
   non overlapping bandwidths; and
   an image acquisition apparatus sensitive to said one of:
   said plurality of monochromatic lights, and
   said non-overlapping bandwidths for simultaneously taking an image of each of said projected patterns on the object.

2. The three-dimensional image grabber as recited in claim 1, wherein at least one of said at least two phase-shifted patterns is monochromatic.

3. The three-dimensional image grabber as recited in claim 1, wherein said pattern projection assembly includes a semi-transparent plate including a pattern to be illuminated by an illuminating assembly, a spectral splitter to be positioned between said semi-transparent plate and said illuminating assembly and a projector for projecting said semi-transparent plate onto said object; said illuminating assembly including a source of white light so positioned as to be projected through said semi-transparent plate.

4. The three-dimensional image grabber as recited in claim 3, wherein said illuminating assembly further includes an optical fiber and a condenser for bringing light from said white source to said semi-transparent plate.

5. The three-dimensional image grabber as recited in claim 3, wherein said semi-transparent plate is a grid.

6. The three-dimensional image grabber as recited in claim 1, wherein said pattern projection assembly includes at least two pattern projecting apparatuses and a reflecting arrangement; each of said pattern projecting apparatus being configured to project a light having a predetermined bandwidth-through a pattern; said reflecting arrangement being so configured as to direct said projected patterns along a common direction of incidence.

7. The three-dimensional image grabber as recited in claim 6, wherein at least one of said pattern projecting apparatuses includes a semi-transparent plate including a pattern to be illuminated by an illuminating assembly and a projector for projecting said plate onto said reflecting arrangement; said illuminating assembly including a source of light having a predetermined bandwidth and being so positioned as to be projected through said plate.

8. The three-dimensional image grabber as recited in claim 6, wherein said projecting arrangement includes at least one of a mirror and a semi-transparent mirror.

9. The three-dimensional image grabber as recited in claim 7, wherein said plate is a grid.

10. The three-dimensional image grabber as recited in claim 7, wherein said pattern projecting apparatuses are so positioned relative to each other as to each provide a same distance from said plate to the object.

11. The three-dimensional image grabber as recited in claim 1, wherein said image acquisition apparatus includes at least one camera sensitive to one of:
said plurality of monochromatic lights, and
said non-overlapping bandwidths.

12. The three-dimensional image grabber as recited in claim 11, wherein said image acquisition apparatus includes a telecentric lens.

13. The three-dimensional image grabber as recited in claim 1, wherein said image acquisition apparatus includes at least two cameras, each sensitive to one of:
said plurality of monochromatic lights, and
said non overlapping bandwidths.

14. The three-dimensional image grabber as recited in claim 11, wherein said camera is selected from the group consisting of a Charge Coupled Device (CCD) camera and a Complementary Metal-Oxide-Silicon (CMOS) device.

15. A three-dimensional image grabber, comprising:
a means for simultaneously projecting at least two phase-shifted patterns onto the object; each of said projected patterns being produced by decomposition of one of: a white light; and a non-white light including a plurality of monochromatic lights; into one of: a plurality of monochromatic lights, and: non overlapping bandwidths; and
a means for simultaneously taking an image of each of said projected patterns on the object; said image taking means being sensitive to one of: said plurality of monochromatic lights and: said non overlapping bandwidths.

16. A system for measuring the relief of an object, said system comprising:
a pattern projecting assembly for simultaneously projecting at least three phase-shifted patterns onto the object; each of said projected patterns being characterized by a predetermined bandwidth;
an image acquisition apparatus sensitive to said predetermined bandwidths for taking an image of each of said at least three phase-shifted projected patterns on the object; each of said images including a plurality of pixels having intensity values; and
a controller configured for:
a) receiving from the image acquisition apparatus said at least three images of the projected patterns onto the object;
b) computing the object phase for each pixel using the at least three object intensity values for the corresponding pixel; and
c) computing the relief of the object at each pixel position using said object phase at the corresponding pixel position;
wherein said pattern projecting assembly includes a grid illuminated by an illuminating assembly, a spectral splitter to be positioned between said grid and said illuminating assembly and a projector for projecting said illuminated grid onto said object; said illuminating assembly including a source of white light so positioned as to be projected through said grid.

17. A system for measuring the relief of an object, said system comprising:
a pattern projecting assembly for simultaneously projecting at least three phase-shifted patterns onto the object; each of said projected patterns being characterized by a predetermined bandwidth;
an image acquisition apparatus sensitive to said predetermined bandwidths for taking an image of each of said at least three phase-shifted projected patterns on the object; each of said images including a plurality of pixels having intensity values; and
a controller configured for:
a) receiving from the image acquisition apparatus said at least three images of the projected patterns onto the object;
b) computing the object phase for each pixel using the at least three object intensity values for the corresponding pixel; and
c) computing the relief of the object at each pixel position using said object phase at the corresponding pixel position; wherein said pattern projection assembly includes at least two pattern apparatuses and a reflecting arrangement; each of said pattern projecting apparatus being configured to project a light having a predetermined bandwidth through a pattern; said reflecting arrangement being so configured as to direct said projected patterns along a common direction of incidence.

18. The system as recited in claim 16, wherein said image acquisition apparatus includes at least one camera sensitive to said predetermined bandwidths.

19. The system as recited in claim 16, wherein said computer includes memory means for storing said images during their process.

20. The system as recited in claim 16, wherein said computer includes at least one of a storing device, an input device and an output device.

21. The use of the system of claim 16, for lead-coplanarity inspection.

* * * * *